United States Patent [19]

Ambros et al.

[11] 4,382,906
[45] May 10, 1983

[54] METHOD OF AND AN APPARATUS FOR THE EVALUATION OF BURNED-OUT NUCLEAR FUEL ELEMENTS

[75] Inventors: Rainer Ambros, Biblis; Gottfried Paffrath, Worms, both of Fed. Rep. of Germany

[73] Assignee: Rheinisch-Westfälisches Elektrizitatswerk AG, Essen, Fed. Rep. of Germany

[21] Appl. No.: 174,171

[22] Filed: Jul. 31, 1980

[30] Foreign Application Priority Data

Aug. 2, 1979 [DE] Fed. Rep. of Germany ....... 2931336

[51] Int. Cl.³ .......................................... G21C 17/00
[52] U.S. Cl. ................................... 376/247; 376/251; 376/253
[58] Field of Search ................. 376/253, 250, 251, 247

[56] References Cited

U.S. PATENT DOCUMENTS

| | | | |
|---|---|---|---|
| 3,073,767 | 1/1963 | Whitman et al. | 376/253 |
| 3,248,297 | 4/1966 | Moore et al. | 376/253 |
| 3,375,169 | 3/1968 | McHugh et al. | 376/253 |
| 3,419,467 | 12/1968 | Holzer et al. | 376/253 |
| 4,147,587 | 4/1979 | Utamara et al. | 376/313 |

FOREIGN PATENT DOCUMENTS

| | | |
|---|---|---|
| 1069791 | 11/1959 | Fed. Rep. of Germany . |
| 604325 | 12/1977 | Switzerland . |
| 607240 | 12/1977 | Switzerland . |
| 917937 | 2/1963 | United Kingdom ............... 376/253 |

Primary Examiner—Sal Cangialosi
Attorney, Agent, or Firm—Karl F. Ross; Herbert Dubno

[57] ABSTRACT

Nuclear fuel elements or slugs are removed from the nuclear reactor cores and subjected to inspection, according to the invention, by introducing a plurality of such elements into a submerged inspection vessel which is then closed, the liquid driven out by compressed air and deionized water (deionate) circulated through the inspection vessel at a constant rate. A portion of the deionized water is branched from the circulating stream at a constant rate and the activity of at least one fission-product nuclide is determined continuously to plot the activity versus temperature, thereby signaling a possible defect in the shell of a fuel element. In addition, ultrasonic vibration is applied in the inspection vessel to the fuel elements so that deposits on the exterior thereof are released into the deionate whose circulating path includes a filter and an ion-exchange column for removal of such deposits.

6 Claims, 3 Drawing Figures

METHOD OF AND AN APPARATUS FOR THE EVALUATION OF BURNED-OUT NUCLEAR FUEL ELEMENTS

FIELD OF THE INVENTION

Our present invention relates to a method of handling (inspecting) or treating nuclear fuel elements and especially burned-out nuclear fuel elements. It also relates to an apparatus for carrying out this method.

BACKGROUND OF THE INVENTION

In the reprocessing of nuclear fuels, it is a common practice to remove a multiplicity of burned-off nuclear fuel elements or slugs from the core of a nuclear reactor and to replace them with fresh nuclear fuel elements. The nuclear fuel elements can have an elongated shape and comprise a can or casing containing a fissionable material, e.g. uranium, in elemental form or in the form of a compound such as uranium oxide. The burned-out fuel elements also include various fission products which, if the casing or can is cracked or otherwise flawed, may pose a problem of contamination during subsequent transport, storage, or handling.

It has also been proposed to subject the burned-out fuel elements, upon removal of the reactor core, to an inspection to assure the integrity of the fuel element before it is placed, for example, in a transport container or a storage container for delivery to or temporary storage at a nuclear-fuel reprocessing center.

The inspection can be effected in an inspection vessel submerged in a liquid with a liquid sample being taken from the inspection vessel. The activity of at least one fission-product nuclide can then be measured and, if the fuel element is found to be intact, can be placed in a transport container for normal or routine delivery to the fuel processing center. If the fuel element is found to be damaged in some way, it can also be placed in a container and subjected to special handling, e.g. because contamination of the transport container may also pose a problem.

The process for detecting defects in fuel elements in this manner is known as the wet sipping process. In this process the inspection vessel, open at its upper and lower ends, is immersed to a depth of about 10 meters in a bath of water or boric acid and can accommodate but a single fuel element. The fuel elements are individually inserted into the inspection vessel and for each inspection stage the top of the inspection vessel is closed, an air cushion is formed and a natural or convective circulation is permitted in the bath. The fuel element becomes heated by the radioactive decay process so that any leak in the tubular casing, shell or can will release fission products into the aqueous phase.

Samples are taken from the water in the vessel and analyzed for the presence of such fission products to determine whether any such defect may exist.

Since, before sampling, each individual fuel element must be stored for a given minimum period to allow sufficient heat buildup, the process is extremely time-consuming. In addition, the contamination of the water of the bath continuously increases and poses a problem with respect to any subsequent samplings of the vessel water for fission-product nuclides.

The process is thus inexact and even efforts to overcome the lack of precision by multiple samplings and measurements for each fuel element have not completely overcome these disadvantages. As the number of samplings and measurements is increased, moreover, the time which must be expended on each fuel element likewise increases and renders the process uneconomical.

In the conventional approach, after a predetermined period of storage in the inspection vessel, each fuel element is introduced into a transport container for temporary storage and/or delivery to a fuel reprocessing center.

Experience has shown that fuel elements generally have deposits adhering to them which are capable of radioactively contaminating the environment and hence the transfer of even an intact fuel element to the transport container may serve to contaminate the latter by the adherent surface contaminants.

In the conventional system, the internal contamination of the transport container resulting from adherent deposits on the fuel elements transported therein builds up to an unsatisfactory level and the transport container must be subjected at considerable cost and effort, to an internal decontamination or cleaning process which utilizes much space in the nuclear power plant or reprocessing center, wastefully utilizes equipment and poses the threat of contamination to personnel.

OBJECTS OF THE INVENTION

It is the principal object of the present invention to provide an improved method of inspecting nuclear fuel elements whereby the disadvantages of earlier systems are obviated.

Yet another object is to provide an improved method of handling or treating nuclear fuel elements and especially burned-out fuel elements to eliminate the danger of contamination of transport containers and handling personnel where intact fuel elements are concerned.

Yet another object of the invention is to provide an improved inspection facility or apparatus capable of carrying out such methods.

SUMMARY OF THE INVENTION

These objects and others which will become apparent hereinafter are attained in accordance with the present invention in a process which involves the inspection and external decontamination of nuclear fuel elements, permits the temperature buildup to be effected in a much shorter period of time and nevertheless allows accurate determination of defects in the cladding of nuclear fuel elements.

According to the invention, a plurality, i.e. at least three and presumably more, say four to twelve, nuclear fuel elements are introduced into a submerged inspection vessel which is then completely closed to separate the interior of this inspection vessel from the surrounding bath of water or boric acid. The liquid in the inspection vessel is then replaced by deionized water free from radioactive fission products or elements (activity-free water) hereinafter referred to as the deionate.

A deionate stream at a constant rate of flow is withdrawn from the inspection vessel and its radionuclide activity is continuously monitored as a function of the temperature in the inspection vessel to determine whether all of the fuel element casings are intact or whether one or more of the fuel element casings may have a defect.

The fuel elements within the inspection vessel are subjected to ultrasonic vibration to solubilize and dislodge contaminants (deposits or crud) on the surfaces of the fuel elements, these contaminants being removed by circulating the deionate through a separation stage.

The invention is based upon our discovery that it is possible to detect fuel element defects by processing simultaneously a multiplicity or burned-out fuel elements, thereby accelerating the overall process since most fuel elements inspected will be found to be free from the defects. The temperature rise in the inspection vessel, essential to an effective determination, is far more rapid when a multiplicity of fuel elements are present.

When, for example, the monitoring of the activity of the tapped deionate stream as a function of temperature indicates a defective fuel element, each of the fuel elements within the inspection vessel may be subjected to single wet sipping inspection by the conventional process to distinguish which among them is or are the defective element or elements.

Furthermore, the system provides a more precise indication of a defect because, rather than sampling at intervals, the deionate is continuously tapped and monitored. The continuous or quasicontinuous monitoring of the activity of at least one radionuclide (for example cesium-137), as a function of temperature will show a sharp change in the activity profile when one or more of the elements is defective, by comparison with the activity profile for intact fuel elements.

The inspection vessel and the circulating deionate also serve to remove contaminants which may be present on the surface of the fuel elements upon their withdrawal from the nuclear reactor core. The fuel elements which are then removed from the inspection vessel can be placed into transport containers for delivery to the fuel reprocessing center and/or storage without concern that the transport containers will be internally contaminated. The system of the invention, therefore, eliminates any need for special decontamination of the transport containers.

To prevent mixing of the immersion liquid with the deionate, the present invention provides that the liquid in the inspection vessel, after introduction of the fuel elements and closure, is initially driven out (expressed) with compressed air, the compressed air being in turn displaced by the deionate.

The continuously withdrawn sample of the deionate can be replaced by an equal amount of deionate but, whether or not replaced, should be relatively small in volume by comparison with the volume of the inspection vessel.

Furthermore, the rate at which this deionate sample is withdrawn for continuous monitoring of activity should be small by comparison with the circulating rate of the deionate.

The inspection vessel according to the invention should accommodate a multiplicity of fuel elements and can be provided with means for completely sealing the interior of the inspection vessel against the surrounding liquid.

The inspection vessel should have at least two pipes or fittings enabling the original liquid to be displaced and deionate to be introduced, while a line must be provided to allow the continuous tapping of a small portion of the deionate from the inspection vessel, this line being provided with activity and, preferably, temperature monitoring means. Alternatively, the temperature monitoring means can include a sensor in the inspection vessel itself.

According to an essential feature of the invention, an ultrasonic generator, e.g. an electrical-mechanical ultrasonic transducer, can be provided within the inspection vessel which advantageously also is connected in a deionate circulation path including a separator for the surface contaminants removed by ultrasonic vibration.

The deionate activity monitor can be tapped into the circulation path upstream of the separator and hence in parallel therewith. The activity measurement can thus be used also to control the cleaning process.

According to yet another feature of the invention, the separator can include a filter for mechanical removal of particulate contaminants and an ion exchanger for the chemical removal of solubilized contaminants.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
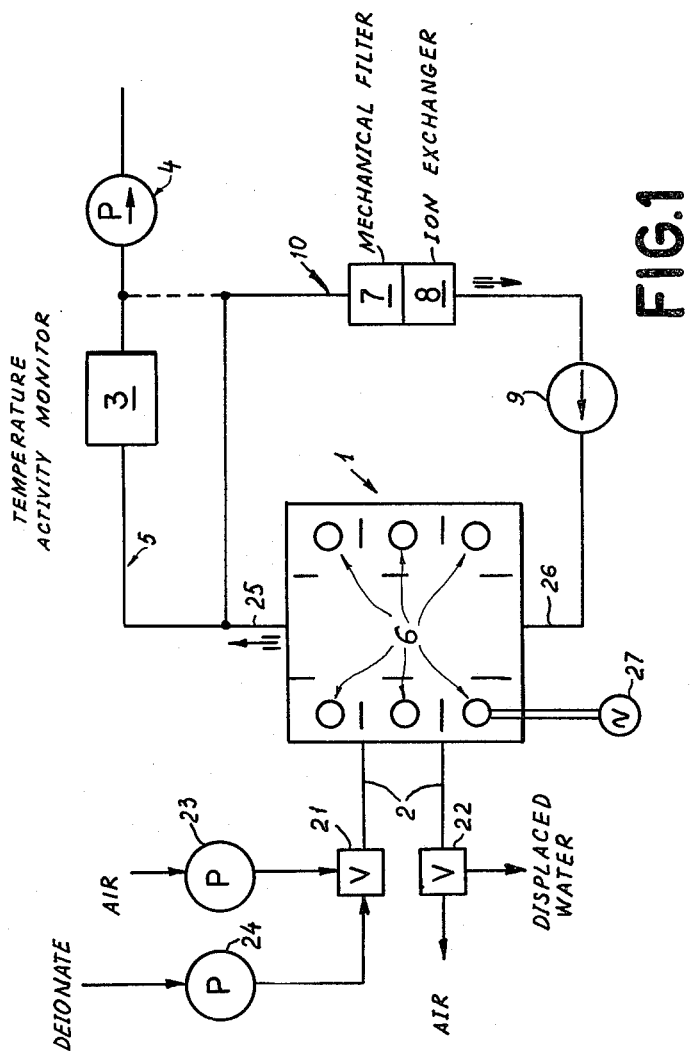
FIG. 1 is a flow diagram illustrating an inspection vessel and associated elements in accordance with the present invention.
Figure 2:
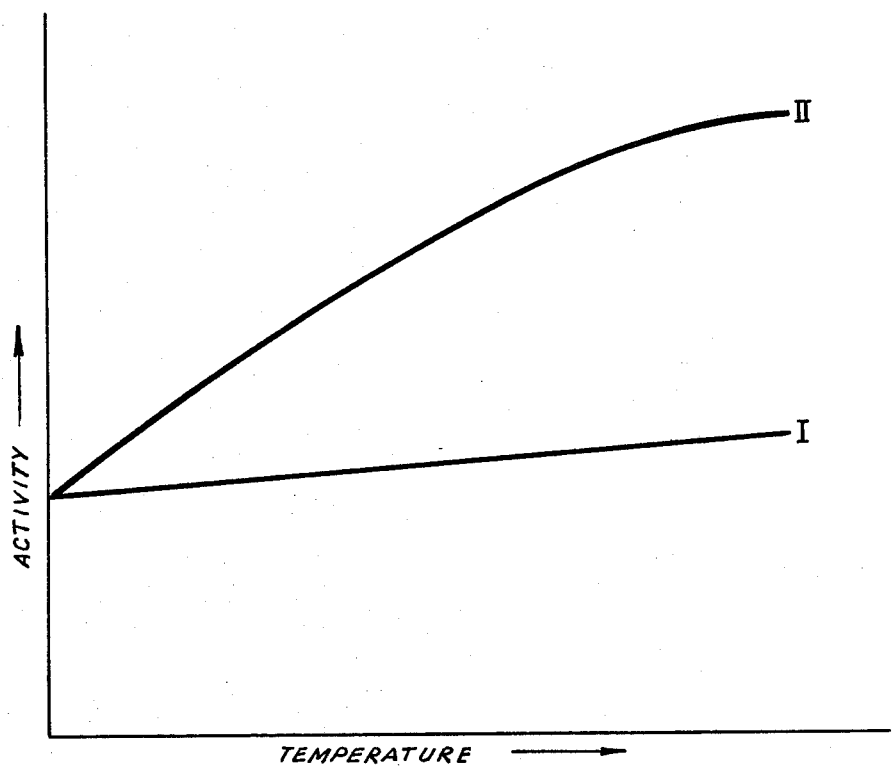
FIG. 2 is an activity/temperature diagram in which the characteristic I for a group of intact fuel elements is compared with the characteristic II of a group of fuel elements corresponding in number but including a defective fuel element.
Figure 3:
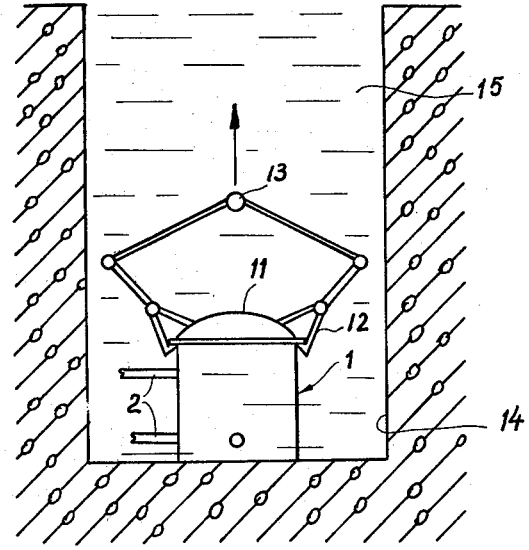
FIG. 3 is a vertical section showing the inspection vessel of FIG. 1 immersed in water or aqueous boric acid.

The inspection vessel 1 shown in FIG. 1, is adapted to accommodate a multiplicity (in this case six) of burned-out nulcear reactor fuel elements and thus has individual receptacles, seats or compartments represented by the partitions 20 for this purpose. The inspection vessel 1 is adapted, as shown in FIG. 3, to be introduced into a basin 14 which can be ten or more meters in height above the vessel 1 and receives water or aqueous boric acid as a so-called immersion bath 15.

The inspection vessel 1 is provided with a cover 11 which can be latched in place at 12 to completely seal the interior of the vessel against incursion of the liquid from bath 15. When a crane hook lifts the ring 13, the latches 12 are released to enable the cover 11 to be removed and the fuel elements inserted or removed.

Referring again to FIG. 1, it can be seen that the inspection vessel 1 has two ducts 2 which can be connected to distributing valves 21 and 22. Valve 21 can connect a compressor 23 or a deionate source such as a pump 24 to one of the lines 2, the valve 22 discharging displaced water and vented air, respectively. Thus the lines 2 serve to allow replacement of the originally enclosed liquid by compressed air and then replacement of the air by the deionate, respectively.

The inspection vessel is also provided with a deionate circulation bath represented generally at 10 and comprising an outlet 25 from the inspection vessel and an inlet 26 thereto. The outlet 25 is branched to a deionate withdrawal line 5 provided with a temperature and activity monitor 3 and a first pump 4.

The recirculating path 10 includes a separator 7, 8 including the mechanical filter 7 and an ion exchanger 8. A second pump 9 sustains the circulation.

Within the vessel at each of the seats for a fuel element, there is provided a respective ultrasonic transducer 6 immersed by a high frequency alternating current source 27 to remove surface impurities or crud from the fuel elements. The crud, partially solubilized, is entrained to the crud separator 7,8.

The deionate line 5 is connected upstream of the separator 7,8 and in parallel therewith as represented by the broken line.

A multiplicity of burned-out nuclear reactor fuel elements are introduced into the uncovered inspection vessel 1 submerged in the water or boric acid bath. The cover 11 is then applied to seal the interior of the inspection vessel 1 from the bath.

Compressed air is introduced into the vessel 1 via one of the lines 22 to drive out the bath liquid and thereafter the compressed air is driven out or compressed with the deionate. A constant stream of deionate, whose total quantity is insifnificantly small by comparison with the total volume of the vessel 1 is continuously withdrawn via line 5 and the gamma activity of cesium-137 is measured by the activity monitor 3 and plotted as a function of temperature of the liquid withdrawn from the vessel. The slopes of the curves, which correspond to the curves I and II of intact and effective fuel elements, respectively, show marked differences and thus allow a defect in one of the fuel elements to be readily ascertained. Each of the elements, upon detection of a defect, can then be inspected by the individual sipping method.

In addition, the ultrasonic transducers 6 dislodge and solubilize the surface contaminants on the fuel elements, the resulting crud being entrained in the liquid which is circulated along the path 10 and removed by the separator 7, 8 before being returned to the inspection vessel. The intact fuel elements can then be placed in transport containers which remain uncontaminated. The defective fuel elements may be handled separately or placed in transport containers which are already contaminated or are disposed of with the fuel element.

We claim:
1. A method of handling burned-out fuel elements from a nuclear reactor core, said method comprising the steps of:
   (a) introducing a plurality of said fuel elements into an inspection vessel immersed in a bath;
   (b) sealing said vessel from said bath;
   (c) recirculating deionized water through the closed vessel at a constant rate;
   (d) withdrawing a stream of deionized water from said vessel and measuring substantially continuously the activity of at least one radionuclide in said stream as a function of temperature, thereby detecting a defect in a fuel element in said vessel;
   (e) ultrasonically dislodging contaminants from said fuel elements into the deionized water circulated in step (c); and
   (f) removing said contaminants from the recirculated water of step (c).

2. The method defined in claim 1 wherein bath liquid is expressed from said vessel upon the closure thereof in step (b) by introducing compressed air into said vessel, and displacing said compressed air with deionized water.

3. The method defined in claim 2 wherein total quantity of deionized water of said stream is negligibly small by comparison to the volume of said vessel.

4. An apparatus for the handling of burned-out nuclear reactor fuel elements, comprising:
   means forming an immersion bath;
   an inspection vessel adapted to accommodate a plurality of said fuel elements immersed in said bath;
   means for closing said vessel off from said bath;
   at least two ducts connected with said vessel for displacing bath liquid with compressed air and displacing compressed air with deionized water in said vessel;
   means for withdrawing a stream of deionized water from said vessel substantially continuously measuring the activity of at least one radionuclide therein as a function of the temperature of the deionized water to detect a defect in a fuel element in said vessel;
   at least one ultrasonic transducer connected to said vessel for causing contaminating deposits on said fuel elements to transfer to water in said vessel; and
   means for recirculating deionized water in said vessel at a constant rate along a path including at least one separator for removing entrained contaminants containing said deposits from the recirculated water.

5. The apparatus defined in claim 4 wherein the means for withdrawing said stream from said vessel is a duct branched from said path upstream of said separator.

6. The apparatus defined in claim 4 or claim 5 wherein said separator includes a mechanical filter and an ion exchanger.

* * * * *